April 18, 1950      J. PEZZANO      2,504,725
SUSPENSION FOR DRIVEN WHEELS
Filed July 3, 1945      3 Sheets-Sheet 1
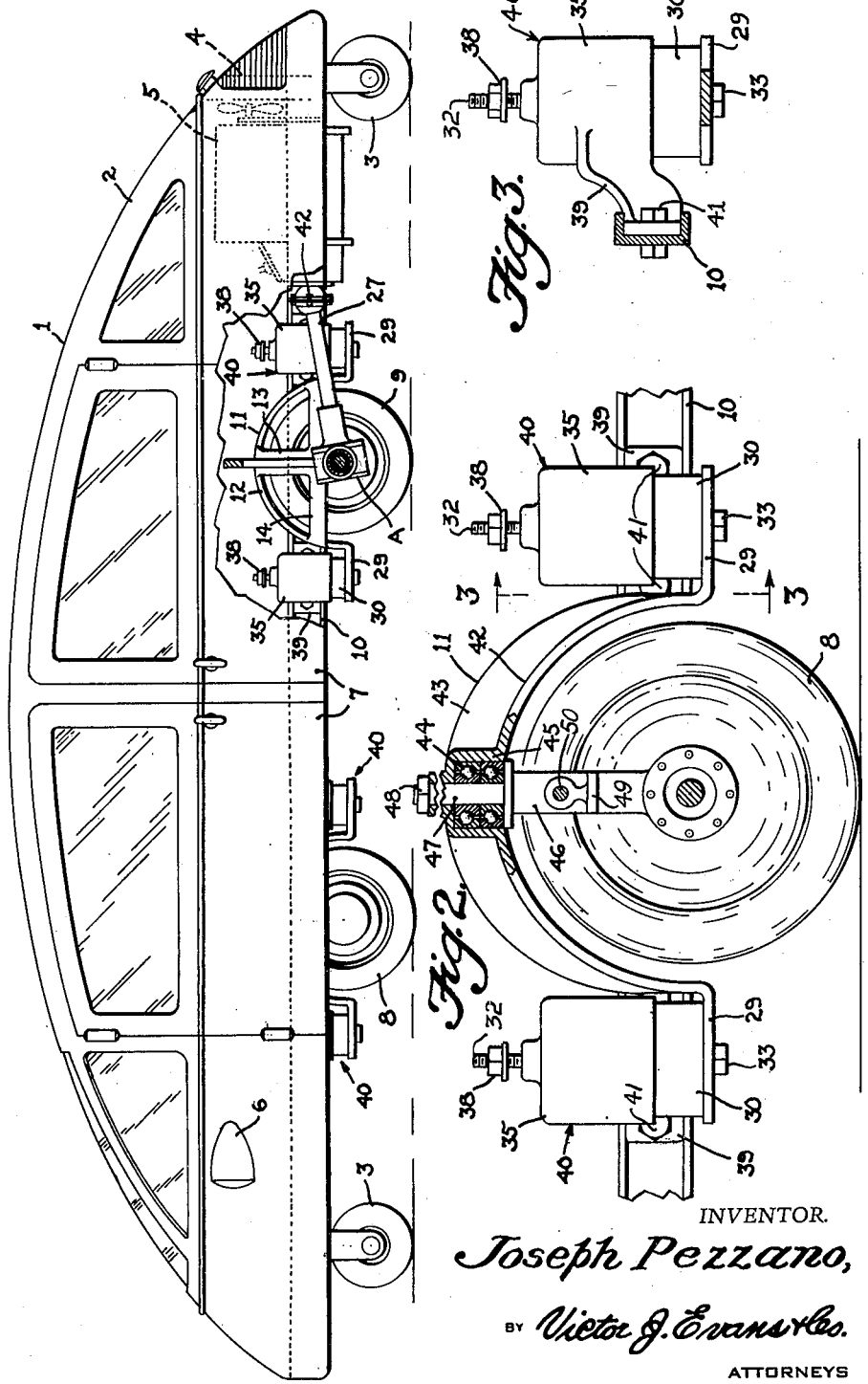
INVENTOR.
Joseph Pezzano,
BY Victor J. Evans & Co.
ATTORNEYS

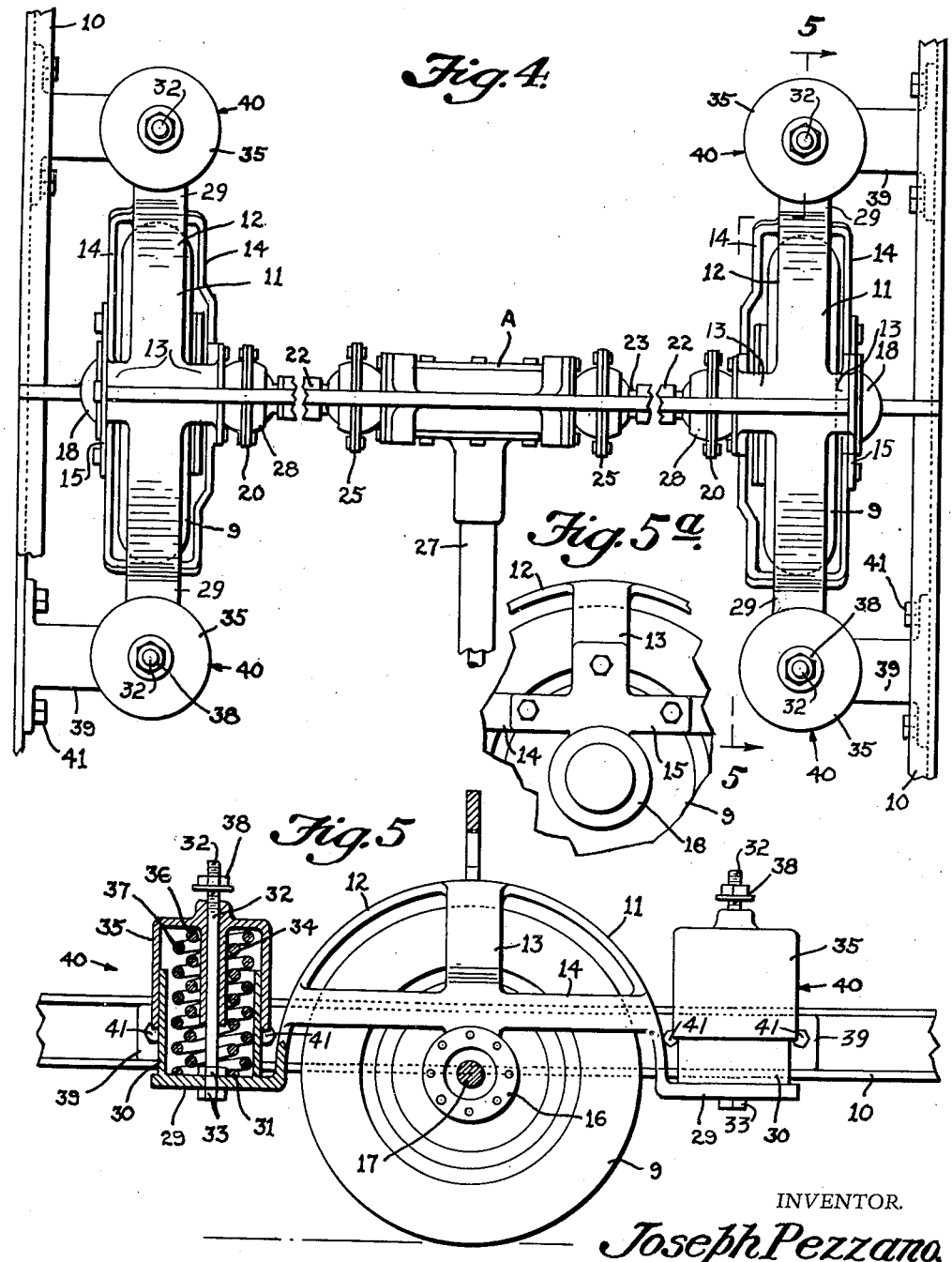

April 18, 1950 J. PEZZANO 2,504,725
SUSPENSION FOR DRIVEN WHEELS
Filed July 3, 1945 3 Sheets-Sheet 3

INVENTOR.
Joseph Pezzano,
BY Victor J. Evans & Co.
ATTORNEYS

Patented Apr. 18, 1950

2,504,725

UNITED STATES PATENT OFFICE 2,504,725

SUSPENSION FOR DRIVEN WHEELS

Joseph Pezzano, Mariners Harbor, N. Y.

Application July 3, 1945, Serial No. 602,966

1 Claim. (Cl. 180—73)

My present invention, in its broad aspect, has reference to improvements in spring suspensions for motor vehicles, and more particularly, it is my purpose to provide an improved spring suspension for the motor vehicle wheels whereby each wheel is independently cushioned to react to irregularities, bumps, roughness and the like, without affecting the other wheels or setting up a reaction in the vehicle body. More especially, it is my purpose to provide an arched truck for each wheel; each truck being cushioned in front and in the back of the wheel, and said cushioning means being unique and improved. Furthermore, I provide novel means for mounting a wheel on a truck, and novel universal means for driving each wheel through universal connection with transmission means.

In effect, each wheel of my device is independent both as to its reaction to jolts and the like, and in its driving and steering, and to this end each wheel is supported and mounted on its truck for driving and steering despite movement of the truck responsive to the reaction of the wheel to irregularities in the road bed.

Other and equally important objects and advantages of my invention are: 1, to provide a unique and improved arched truck and a dash-pot type of connection of the truck to the chassis whereby each truck is mounted on the chassis; 2, to provide unique and improved spring means in the dash-pots whereby the trucks are cushioned on the chassis to be responsive and to absorb shocks transmitted through the wheels due to irregularities in the road bed; 3, to provide improved means for mounting each wheel on a truck; 4, to provide universal means for driving each wheel independently with respect to other wheels from a transmission; 5, to provide means for steering, and for mounting a wheel for steering in its truck; 6, to provide in the construction of the truck improved means for guarding the wheel and preserving an air-flow or stream-lining effect, and 7 to provide a sturdy, practical, simple and effective spring suspension which will afford greater comfort, safety and saving of cost and expense in motor vehicle transportation.

Other and equally important objects and advantages of my invention will be apparent from the following detailed description and drawings, but it is emphasized that while I have shown a specific form of my invention, changes may be made in form, size, shape, construction and arrangement of parts to meet varying conditions of practice without departing from my broad inventive concept, or the scope of the appended claim.

In the drawings wherein I have illustrated a preferred form of my invention—

Figure 1 is a side elevation of a motor vehicle, partly broken away to show my invention applied thereto;

Figure 2 is a detail side elevation partly broken away and in section of the steering mounting for a front wheel;

Figure 3 is a section taken on the line 3—3 of Figure 2;

Figure 4 is a detail top plan view of the rear wheel and universal drive assembly;

Figure 5 is a view taken on the line 5—5 of Figure 4 partly broken away and in section showing the spring suspension for a wheel truck and a non-steering wheel mounting;

Figure 5a shows a detail of the supporting bracket at the outside and partly broken away;

In the drawings wherein like characters of reference are used to designate like or similar parts:

Figure 6:
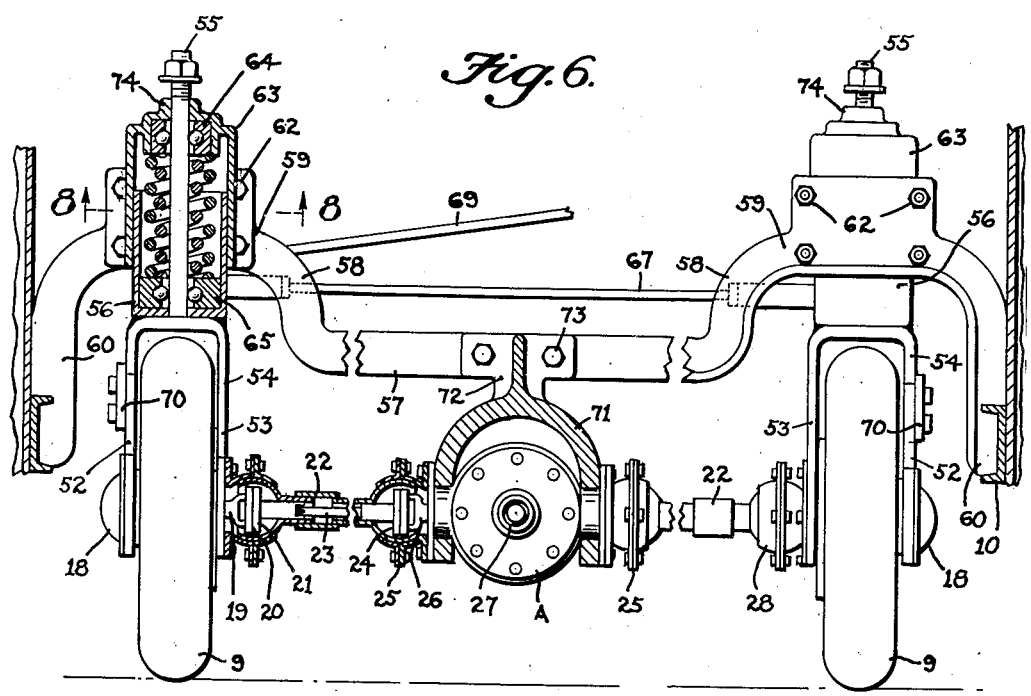
Figure 6 is a rear elevation partly broken away and in section, and showing a partly modified structure, and the transmission, supporting yoke, universal drive, brake drums and transverse chassis frame, and spring suspensions for the trucks.
Figure 7:
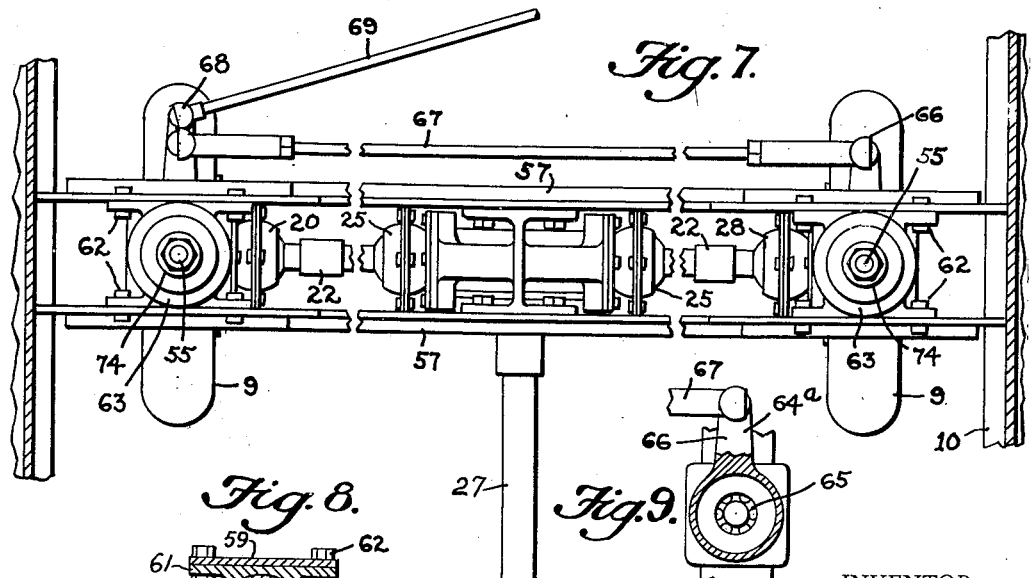
Figure 7 is a top plan view of the form shown in Figure 6, which is both driving and steering.

The motor vehicle body 1 is of an improved streamlined variety, and has an arcuately curved top 2 from front to back, front and rear stabilizing wheels 3, a radiator 4, a motor 5, headlights 6 and doors 7. The body comes down outside the wheels and to a point slightly above the axles. In the form shown in Figure 1 there are front wheels 8 and rear wheels 9. The vehicle has a chassis with longitudinal rails 10, and the front and rear wheels are supported preferably at equal distances to either side of the longitudinal center of the body. It is to be understood that the power plant and radiator, and the like, may be at the front of the vehicle as well as in the back and a four-wheel drive is applicable in all cases.

According to my invention, each wheel is supported independently upon a truck 11. Referring to Figures 4 and 5, which support the rear wheels, each truck has an arcuate body 12 which has reinforcing vertical and horizontal frames 13 and 14 respectively, and carrying a detachable reinforcing plate 15—see Figure 5a—and the frame supports the axle bearings 16 of the wheel. The wheel 9 has an axle 17, and on the outside of the bearing, a cap 18 may be bolted. The axle is formed with one element 19 (the yoke) of a universal joint 20, the other element 21 of which carries a sleeve 22 which is splined to a short shaft 23. The shaft 23 carries an element 24 of a universal connection 25, the other element 26 is connected with the transmission A which is connected with the drive shaft 27 to the motor. Universal joints 20 and 25 both have semi-spherical two-part housings 28. Since both rear wheels are similarly driven, as shown in Figure 4, the foregoing description applying to one wheel applies also to the other.

Each truck body 12 has oppositely and horizontally extending end base sections 29. Each base section 29 carries a cylindrical vertical chamber or pot 30, which may be integral therewith. The floor of the pot 30 has an annular rib 31 and extending upwardly from end base through the pot 30 is a threaded rod 32, the lower end of which is fixed by clamp nuts 33 on the base. Mounted to slide on the rod 32 is a sleeve 34 formed in a top cylindrical chamber or pot 35 which comes down over the lower section in telescoping relationship, as shown in Figure 5. A pair of concentric cooperating springs 36 and 37 seating at one end on the base 29 and about the rod 32 and sleeve 34 and in the top section 35 normally hold the chambers or pots 30 and 35 apart, and the rod has a nut and washer 38 to hold the members 30 and 35 in connected relationship with limited movement with respect to each other. The upper member 35 is bolted to the chassis longitudinal side rail 10 through bracket 39. The above detailed description applies to each spring and dash pot assembly over each end section 29 of each truck body 12. For convenience, each spring and pot assembly will hereinafter be called a spring suspension element generally designated by 40.

By the hereinbefore described means, it will be seen that each rear wheel is independently supported in a truck and independently driven, while each truck is provided with a spring suspension at each end through elements 40 to the chassis, whereby shocks and movement of the wheel is absorbed by the truck and not transmitted to the other wheels or the chassis or vehicle body, and there is no interference with the drive which has universal flexibility and is direct to the wheels and effective to each wheel independently irrespective of movement of the axle and wheel under the influence of jolts, shocks, and road bed irregularities. Brackets 39 may be formed integrally with members 35 and are curved downwardly to engagement in the channels of the chassis side rails 10 where they are bolted as at 41—see Figure 3. As shown in Figure 1, the drive shaft 27 to the motor may be inclined somewhat downwardly toward the transmission, and has the usual universal joint 42 at the motor end.

Referring to Figure 2, the arcuate body 42 of the forward or front truck 11 is reinforced as at 43 to receive a double ball-bearing mounting 44 in a journal 45 for the vertical supporting shaft 46 of the front wheel 9. The shaft 46 has a stub shaft 47 in the bearings 44 and held by a nut 48 for rotating engagement in the journal 45. A steering arm 49 on each shaft 46 is connected to a radius rod 50 and one arm, or the radius rod, may be connected to a steering rod or column 51 not shown for steering the front wheels.

Figure 8:
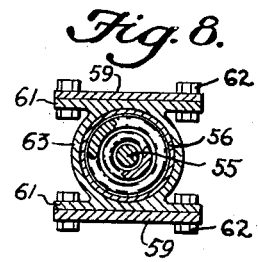
Figure 8 is a section on the line 8—8 of Figure 6.
Figure 9:
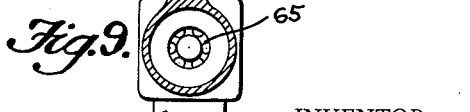
Figure 9 is a detail of a steering knuckle of the type employed in Figures 6 and 7.

Referring to Figures 6, 7, 8 and 9, a modified form of my invention contemplates each wheel being mounted between the arms 52 and 53 of a yoke 54 carrying a vertical shaft 55, on each yoke 54 is mounted a chamber or pot 56. A transverse two part frame 57 is curved upwardly as at 58, then horizontally as at 59 and then downwardly as at 60 at each of its ends. Each frame is made up of similar parellel and spaced frame sections, and the sections are bolted together as at 62 to hold the frame section together in assembly as will be later explained. The ends of the frame sections are attached to the longitudinal side rails 10 of the chassis and the portion 59 have clamped therebetween an upper chamber or pot 63 fitting down on the chamber or pot 56. The pot 63 is provided with opposed parallel flanges 61 through which the bolt 62 will pass and thus the sections are bolted together as shown in Figure 8. Shaft 55 extends upwardly through chambers or pots 56 and 63 and cooperating concentric springs are mounted therein and the shaft 55 is anti-frictionally supported in ball-bearing assemblies 64 and 65 carried respectively by elements 63 and 56. A steering arm 64a is mounted on the element 56 and has an arm 66 connected with the radius rod 67, and another arm 68 may be connected to one wheel assembly or to the radius rod for connection with the steering rod or column 69. For removal of a wheel, the outer arm 52 of each yoke is in two sections detachably connected by a plate 70 for removal of the lower section in which the axle is journaled.

A depending yoke 71 is formed with an I-shaped bracket member 72 which is bolted as at 73 to the frame elements 57 to support the transmission to the universal drive connections to the wheels which is similar in this form of my invention to that of Figure 1. A bearing cap 74 is provided on each upper chamber or pot 63 to support the end of shaft 55.

From the foregoing, it will be seen that the wheels of the modified form are not only mounted for individual response to shocks, jolts, and road irregularities, but are driven independently and steered.

It is believed that the operation and advantages of my invention will be apparent from the foregoing, but interpretation should only be conclusive in the light of the subjoined claim.

I claim:

A spring suspension for the wheels and axles of a motor vehicle chassis frame and the differential for the driving of the wheels, comprising a truck frame having an arched body, reinforcing vertical and horizontal frames on said body, a reinforcing plate at the junction of said last named frames on each side of said body, axle means receivable at its opposite ends respectively in the plate at each side of said body for supporting the wheels in the body, oppositely longitudinally and horizontally extending end pieces on the body, a vertically disposed chamber carried by each end piece, a pair of concentric cooperating coiled springs within each chamber, a vertically disposed rod fixed in each chamber at the center thereof within the coils of said springs, a second chamber attached to the chassis frame above each of said first chambers telescopically engaging each of said first chambers, and said springs bear against said chambers to resiliently support the chassis frame on the truck frame, a depending sleeve formed at the center of each of said second chambers, each of said sleeves adapted to be slidably mounted on each of said rods within the coils of said springs, each of said rods adapted to provide a connection between each end piece and the said first chamber mounted thereon and the second chamber mounted on said chassis frame, and universal connections between the axle means and the differential for the driving of the vehicle wheels.

JOSEPH PEZZANO.

REFERENCES CITED

The following references are of record in the file of this patent:

UNITED STATES PATENTS

| Number | Name | Date |
|---|---|---|
| 682,775 | Yeakley | Sept. 17, 1901 |
| 965,083 | Christie | July 19, 1910 |
| 1,348,991 | Gilpin | Aug. 10, 1920 |
| 1,542,510 | Lancia | June 16, 1925 |
| 1,711,881 | Fornaca | May 7, 1929 |
| 2,212,453 | Perkins | Aug. 20, 1940 |
| 2,247,487 | Garnett et al. | July 1, 1941 |
| 2,310,821 | Wimbish | Feb. 9, 1943 |

FOREIGN PATENTS

| Number | Country | Date |
|---|---|---|
| 175,220 | Switzerland | July 16, 1935 |
| 583,438 | Germany | Feb. 17, 1932 |